US008458264B1

(12) United States Patent
Lee et al.

(10) Patent No.: US 8,458,264 B1
(45) Date of Patent: Jun. 4, 2013

(54) EMAIL PROXY SERVER WITH FIRST RESPONDENT BINDING

(76) Inventors: Chris Lee, Fremont, CA (US); Ronald L. Suciu, Cary, NC (US)

(*) Notice: Subject to any disclaimer, the term of this patent is extended or adjusted under 35 U.S.C. 154(b) by 813 days.

(21) Appl. No.: 12/037,101

(22) Filed: Feb. 26, 2008

(51) Int. Cl.
*G06F 15/16* (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| 6,421,709 | B1 | 7/2002 | McCormick et al. |
| 6,643,687 | B1 | 11/2003 | Dickie et al. |
| 6,718,367 | B1 | 4/2004 | Ayyadurai |
| 6,760,752 | B1* | 7/2004 | Liu et al. ........................ 709/206 |
| 6,772,196 | B1 | 8/2004 | Kirsch et al. |
| 7,054,906 | B2* | 5/2006 | Levosky ........................ 709/206 |
| 7,231,428 | B2 | 6/2007 | Teague |
| 7,363,490 | B2* | 4/2008 | Paulsen et al. ................ 713/154 |
| 2008/0052364 | A1* | 2/2008 | Zhou ............................ 709/206 |

* cited by examiner

*Primary Examiner* — Wing F Chan
*Assistant Examiner* — David X Yi
(74) *Attorney, Agent, or Firm* — File-EE-Patents.com; Jay A. Chesavage

(57) ABSTRACT

An email proxy server receives a registration request from a client having a private email address. The proxy server generates a public email address and associates the public email address with the private email address. Upon receipt of a first email message from a sender having a sender address, the sender address is also associated with the public email address, and a new_from address is generated which is unique. The first and any subsequent email messages which are received with a sender of from@snd.dom and a recipient of public1@flt.dom is sent to the registered recipient by the proxy, using associated sender new_from@snd.dom and registered address private1@rcv.dom. Any reply from the private sender carries the recipient new_from@flt.dom and sender private1@rcv.dom, which are translated by the proxy to from@send.dom and public1@flt.dom, respectively. In this manner, each public address is bound to the first respondent, and is only usable by that respondent.

20 Claims, 11 Drawing Sheets

*Figure 2A*
Message flow diagram
receive to private, min message storage

Figure 2B
Message flow diagram
receive to private, min message storage

Figure 3A
Message flow diagram
receive to private, full message storage

Figure 3B
Message flow diagram
receive to private, full message storage

*Figure 4A*
Message flow diagram
reply from private, full message storage

*Figure 4B*
Message flow diagram
reply from private, full message storage

Figure 5
Data Structures

502
Record for Key1 (Uniquely derived from incoming public1@flt.dom)
STATE = one of {WAIT,ESTABLISH}
ALLOW_FROM=from@snd.com
XLATE_FROM=new_from@flt.dom
XLATE_TO=private1@rcv.dom 504
Record for Key2 (Uniquely derived from incoming new_from@snd.dom)
XLATE_TO = from@snd.dom
XLATE_FROM = to@flt.dom

Figure 6A
Registration

Enter with private1@rcv.dom

602 | Create unique address public1@flt.dom

604 | Key1=unique value derived from public1@flt.dom

606 | Make New Record for Key1:
State=WAIT
XLATE_TO=private1@rcv.dom

Figure 6B
System Operation—Receive to private

608 | Proxy Receive MAIL FROM:from@snd.dom
RCPT TO:public1@flt.dom

610 | Filter/Translator (Fig 6D)

612 | Proxy send MAIL FROM:new_from@flt.dom
RCPT TO:private1@rcv.dom

Figure 6C
System Operation—Send/Reply from private

608 | Proxy Receive MAIL FROM:private1@rcv.dom
RCPT TO:new_from@flt.dom

610 | Filter/Translator (Fig 6D)

612 | Proxy send MAIL FROM:public1@flt.dom
RCPT TO:from@snd.dom

Figure 7
memoryless private email registration
Register private1@rcv.dom public email=xxxyyyprivate1_at_rcv.dom@flt.dom
- xxx: index
- yyy: checksum / encrypt w/private key
- private1_at_rcv.dom: local domain public email=xxxyyyzzzz@flt.dom

Figure 8
memoryless translation from snd.dom receive email TO: xxxyyyzzzz@flt.dom
            FROM: from@snd.dom decrypt and check: xxxyyyprivate1_at_rcv.dom@flt.dom
- xxx: index
- yyy: checksum / decrypt w/private key
- private1_at_rcv.dom: local domain proxy forward TO: private1@rcv.dom
              FROM: xxxfrom_at_snd.dom@flt.dom
- xxx: index fm receive TO:
- flt.dom: local domain

Figure 9
memoryless reply from private1@rcv.dom rply indicator
receive email TO: reply_xxx_from_at_snd.dom@flt.dom
            FROM: private1@rcv.dom generate FROM: xxxyyyprivate1_at_rcv.dom@flt.dom
- xxx: index from TO: field above
- yyy: checksum / encrypt w/private key FROM: xxxyyyzzzz@flt.dom
TO: from@snd.dom

EMAIL PROXY SERVER WITH FIRST RESPONDENT BINDING

FIELD OF THE INVENTION

The present invention relates to an email proxy server for filtering unwanted communications from a sender to a recipient.

BACKGROUND OF THE INVENTION

Figure 1:
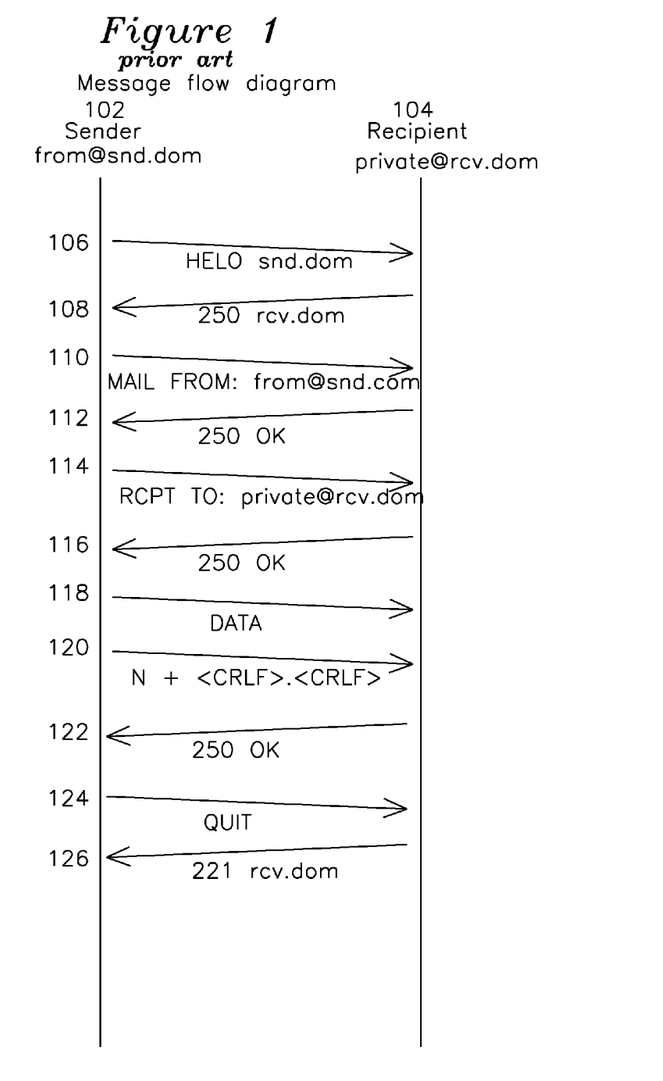
FIG. 1 shows a prior art message flow diagram for messages transmitted using SMTP.

FIG. 1 shows a prior art message flow diagram. Sender 102 with an email address "from@snd.dom" sends a message to recipient server 104 with an email address "private@rcv.dom". Sender 102 and recipient mail server 104 communicate using the Simple Mail Transfer Protocol (SMTP) as described in the internet engineering task force (IETF) standard RFC821, which may include headers as described in IETF RFC2822. The communications shown in the figures may be carried out using any transport protocol, including Transmission Control Protocol of the Internet Protocol (TCP/IP), where TCP/IP has the property of retransmission of missing packets to ensure that the communications channel is free of information loss. In this manner, missing and errored packets do not cause disruption of the SMTP protocol shown in FIG. 1, as they are handled by the underlying TCP protocol.

In the prior art of FIG. 1, a particular sender 102 such as mail transfer agent operates in a first domain "snd.dom" with a user "from", whereby under SMTP the sender email is "from@snd.dom". Similarly, recipient 104 has a username "private" on the domain "rcv.dom", resulting in the recipient email "private@rcv.dom". In one type of network, a domain name is either globally known, such as a registered domain name, which is propagated using a domain name service "DNS", or is locally known within a network, such that for either private or public names, the domain name resolves to an IP address that is reachable to all systems on a network. Within each domain, the users in that domain are locally assigned unique usernames, such that email may be sent from any user "user1@domain1" to any other user "user2@domain2". The Sender 102 and Recipient 104 may be mail transfer agents (MTA) using SMTP, or for the sender 102, may be a mail client using SMTP. Typically, an email client will use SMTP for sending an email, while email servers will use SMTP for sending and receiving email. The SMTP transfer starts with the transmission 106 of a HELO packet which identifies the sending domain as "snd.dom". This packet is acknowledged 108 by the recipient 104 including the recipient domain name in the reply "250 rcv.dom". The sender 102 then transmits SMTP "MAIL FROM: from@snd.com" in step 110 identifying the sender's email address, which is acknowledged by the recipient 112. The sender 102 next identifies the recipient of the email as "private1@rcv.dom" in step 114, which is acknowledged 116. The SMTP "DATA" instruction is sent 118 followed by actual message data 120, which is acknowledged by the recipient 122. The final sender transmission SMTP "QUIT" 124 is acknowledged in step 126.

The well known SMTP provides for simple and efficient transfer of email. A problem arises when a private email address becomes widely known and is used for unsolicited advertising, such as a user email address "private@rcv.dom" is sold or passed from one bulk email sender to another. Among the ways this can occur is when a user registers for a web service, such as a newsletter, or makes a purchase on the internet from a vendor, who then resells customer lists to other promoters, or uses the list for their own unrequested promotions. The user then receives increasing amounts of email wholly unrelated to the original transaction. Once an email address becomes "tainted" in this manner, the user must sort through unwanted email messages among the desired messages. There are many prior art solutions for reducing the amount of unwanted bulk email, many of which rely on content filtering and the like. Filtering an email results in the message being dropped or deleted so that it does not appear in the recipient's mailbox, or alternatively it may be forwarded to another program for further analysis such as to form metrics for mail filtering based on content, as described in the patent prior art section which follows.

One type of prior art filter relies on a combination of message content and sender parameters, including a sender "whitelist" which is always received and a sender "blacklist", which is always rejected, such as described in U.S. Pat. No. 6,421,709. U.S. Pat. No. 6,112,227 uses whitelists and blacklists, and additionally requests a source for an email register if they are not in a database, after which registration they are added to a whitelist, after the original email is forwarded to the recipient. U.S. Pat. Nos. 6,772,196 and 6,718,367 describes a system for examination of the content of the message to classify as a message to be filtered and dropped. U.S. Pat. No. 7,231,428 describes a similar system for management of email aliases that are pre-registered, whereby a message from a sender to an alias is forwarded to a plurality of recipients associated with that alias.

One type of filter relies on a "sender-receiver pair" whereby a sender and a receiver have address mappings, such as described in U.S. Pat. No. 6,643,687 by Dickie et al.

OBJECTS OF THE INVENTION

A first object of this invention is a proxy mail server for SMTP which allows a particular sender to send email to a registered recipient having a private address, whereby a corresponding public address is provided a priori to the sender, which the proxy server has associated with the particular sender, thereby forwarding messages received on the public address to the registered recipient using the private address disclosed during the earlier user registration process. A user would typically request one public address for each separate transaction.

A second object of the invention is a proxy server for SMTP which allows the recipient of an email having a new_sender address which was translated from an original sender address to reply to the original sender by using the new_sender address in combination with a record indexed by the new_sender address to recover the original address for use as a destination address as well as a public address for use as a sender address.

A third object of the invention is a proxy server for SMTP which:

receives and acknowledges an identification part of an email message containing a sender address and a public recipient address, translates the public recipient address to a private recipient address, optionally also translating the sender address to a new_sender address, thereafter either dropping the message if a record corresponding to the public recipient address is not found, or if a record corresponding to the public recipient address is found:

transferring an identification part of the email message to the private recipient address using the new_sender and private recipient addresses found in the record;

accepting one or more message data parts of the email message and sending each respective message data part to the private recipient;

completing and closing the message part with the sender and recipient, respectively.

A fourth object of the invention is a proxy server for SMTP which:

receives and acknowledges a complete email message containing a sender address, a public recipient address, and a message;

translates the public recipient address to a private recipient address, optionally also translating the sender address to a unique new_sender address, thereafter either dropping the message if a record associated with the public recipient address is not found, or if a record associated with the public recipient is found:

sending the message to the private recipient using the private recipient address as recipient address and the new_sender address as sender address.

A fifth object of the invention is a proxy server for replying to messages from a private sender having a private email sender address accompanied by a new_from recipient address by finding a record associated with the new_from recipient, and using entries in the record to translate the addresses to an original sender address for use as recipient and an associated public recipient address to use as a sender address.

A sixth object of the invention is a method for translating between a public address and a private address without using a database or persistent storage.

SUMMARY OF THE INVENTION

An email proxy server has a registration process whereby a user provides a private email address such as "private1@rcv.dom" known to the user's domain, which results in the creation of a single-sender public email address such as "public1@flt.dom", where flt.dom is the domain of the proxy which provides an email filtering function, and the registration also causes the creation of a record containing a STATE variable initialized to WAIT, and a XLATE_TO variable set to the registrant's private email address such as "private1@rcv.dom" of the present example. This record may be accessed via a first key based on a public email address, such as a hash of the assigned address public1@flt.dom, which simplifies a record search. When an email is received for a recipient such as public1@flt.dom, a search for record "public1" is conducted using the first key as described. If no record is found, indicating the sender is unaware of the recipient's public address, the sender's email is received and discarded. If a record is found associated with "public1", and the STATE variable of the record is WAIT, indicating a first use, the XLATE_FROM variable of the record is set to a unique address which may later be used to translate reply message addresses. In the present example, XLATE_FROM is set to "new_from@flt.dom", and an optional ALLOW_FROM field is also initialized with the sender's address, and the STATE variable of the record is changed to ESTABLISH. Optionally, a new reply record may be generated from a unique second key value such as the XLATE_FROM value, which can be used for reply messages, and may contain XLATE_FROM and XLATE_TO fields for translating sender and recipient fields back to the original values used in the first use message from sender to proxy server.

If an email message with a recipient address such as "public1@flt.dom" is received by the proxy server, and a record is found for "public1" with the corresponding record STATE variable of ESTABLISH, the XLATE_FROM and XLATE_TO variables from the first record are used, in the present example, the recipient public1@flt.dom is translated to "private1@rcv.dom" and the sender "from@snd.dom" is translated to "new_from@flt.dom", and the original message is sent with this new header information to private1@rcv.dom.

If private1@rcv.dom replies to this message from new_from@flt.dom, the email proxy uses new_from@flt.dom as a key to find an associated reply record which contains from@snd.dom and public1@flt.dom, which are used as recipient and sender addresses, respectively.

DETAILED DESCRIPTION OF THE INVENTION

Figure 2A:
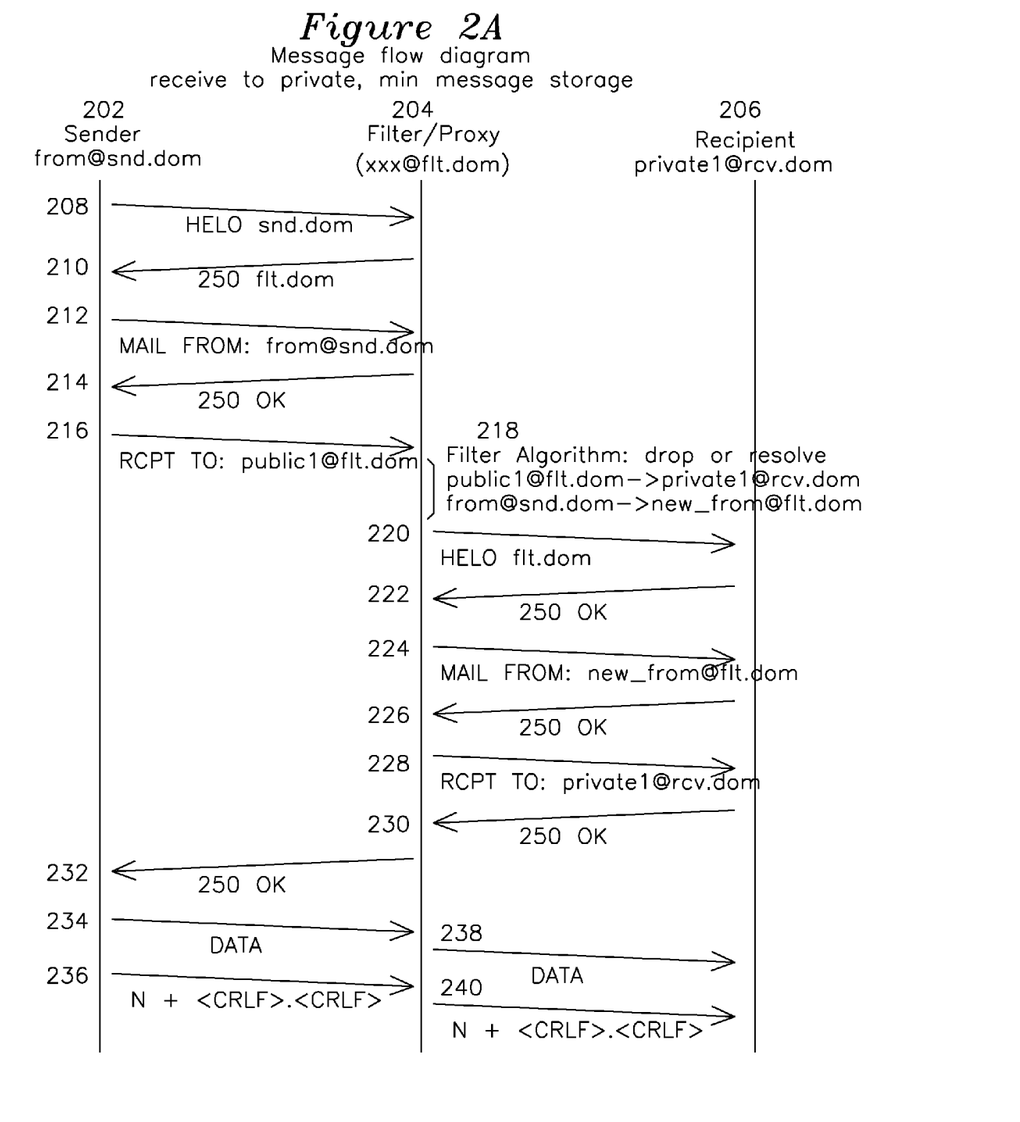
FIGS. 2A and 2B show a message flow diagram from a sender to a proxy and to a recipient according to one embodiment of the invention which minimizes storage requirements of the proxy server.
Figure 2B:
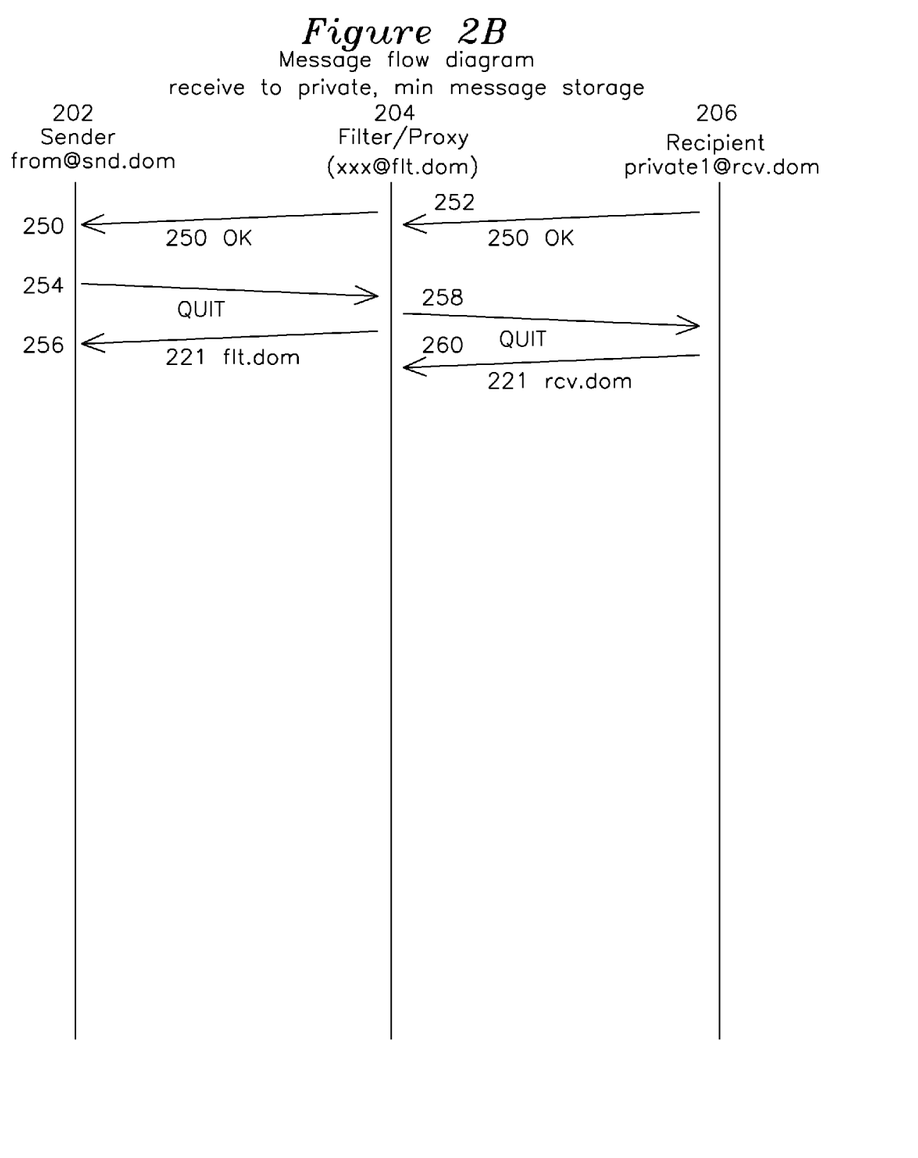

FIGS. 2A and 2B show a message flow diagram for the present invention, using a minimum storage requirement embodiment. Sender 202 sends a message to recipient 206 via filter proxy server 204. The function of filter/proxy server 204 is to conceal the recipient 206 private email address and to receive, but not forward, any email from a sender such as 202 which does not contain the registered public email address for this sender. The proxy server accepts a header part of the message in steps 208 through 216, including SMTP HELO command from the sender in step 208, proxy acknowledgement 210, SMTP MAIL FROM identifying the sender in step 212, acknowledgement 214, and SMTP RCPT TO identifying the public address on the proxy server, such as "public1@flt.dom" of the present example. Upon receipt of the "MAIL FROM" and "RCPT TO" values, the filter algorithm is invoked in step 218, which does a search for records based on the recipient public address such as "public1". If the address "public1" is either unknown to the proxy server, or is not an accepted sender for this email address, the message is received such as by sending acknowledgement 232 and receiving data 234 and sending acknowledgement 236, but the message data is ignored, and steps 220-230 are not performed, so the message is not forwarded to a user. The message may be sent to another process for additional examination, such as a bulk email analysis program which identifies and blocks particular senders. If the user "public1" is known to the proxy server in step 218, and the sender matches the value corresponding to this public address, the RCPT TO and MAIL FROM addresses are translated to new addresses found in the record associated with the address "public1", shown in the example as "new_from@flt.dom" and "private1@rcv.dom". These addresses are then used in the header part of the exchange shown in steps 220, 222, 224, 226, 228, and 230. When this is completed, the header acknowledgement 232 is sent to the sender, after which the SMTP DATA command 234 followed by message data 236 from sender is forwarded to the recipient in related steps 238 and 240. By forwarding each individual message component 236 and 238, a large email message such as 100 MB may be forwarded to the recipient in 1024 byte increments with a minimal message memory requirement in proxy server 204. The exchange is completed with data acknowledgements 250 and 252, and SMTP QUIT command and acknowledgement, 254 and 256, and 258 and 260, are issued for sender and recipient respectively.

Figure 3A:
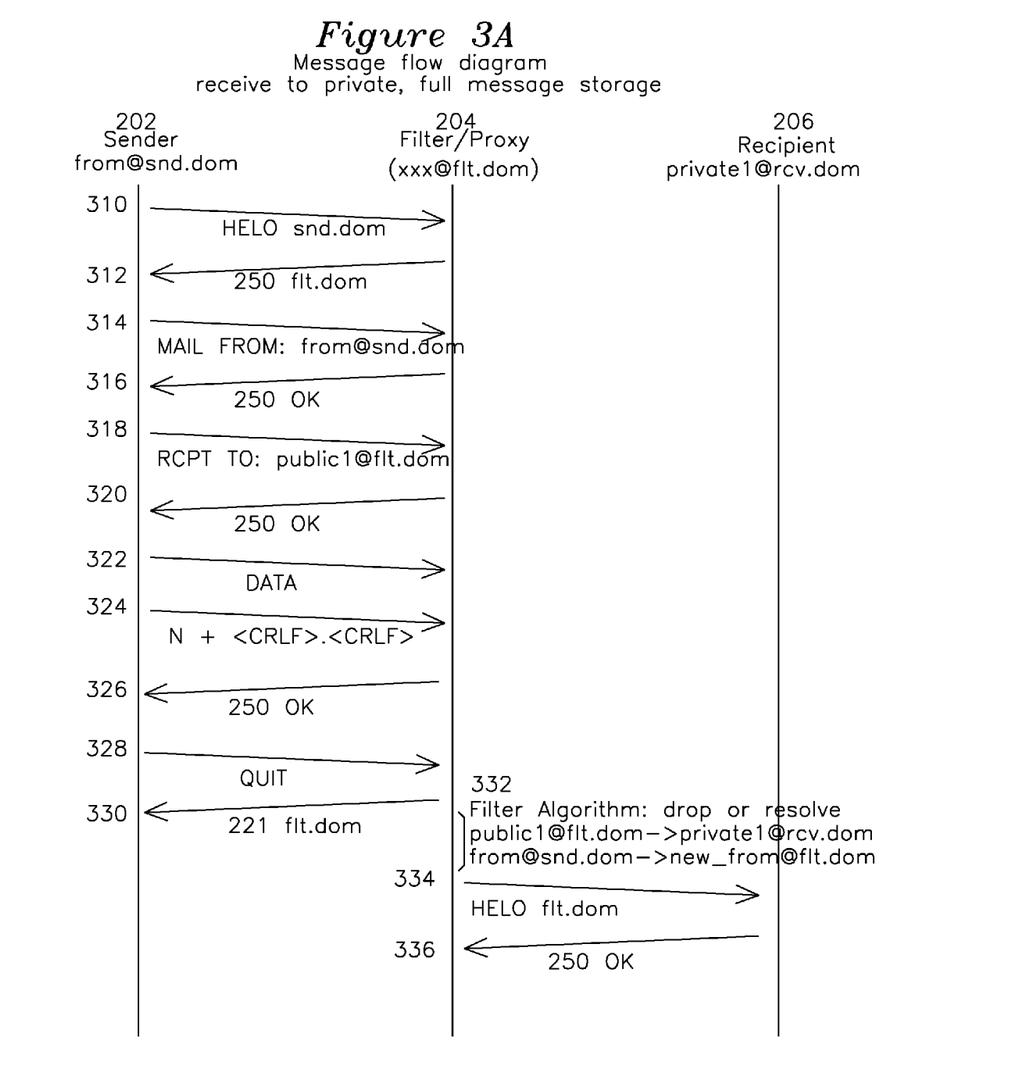
FIGS. 3A and 3B show a message flow diagram from a sender to a proxy and to a recipient according to another embodiment of the invention which saves an entire message prior to forwarding to a recipient.
Figure 3B:
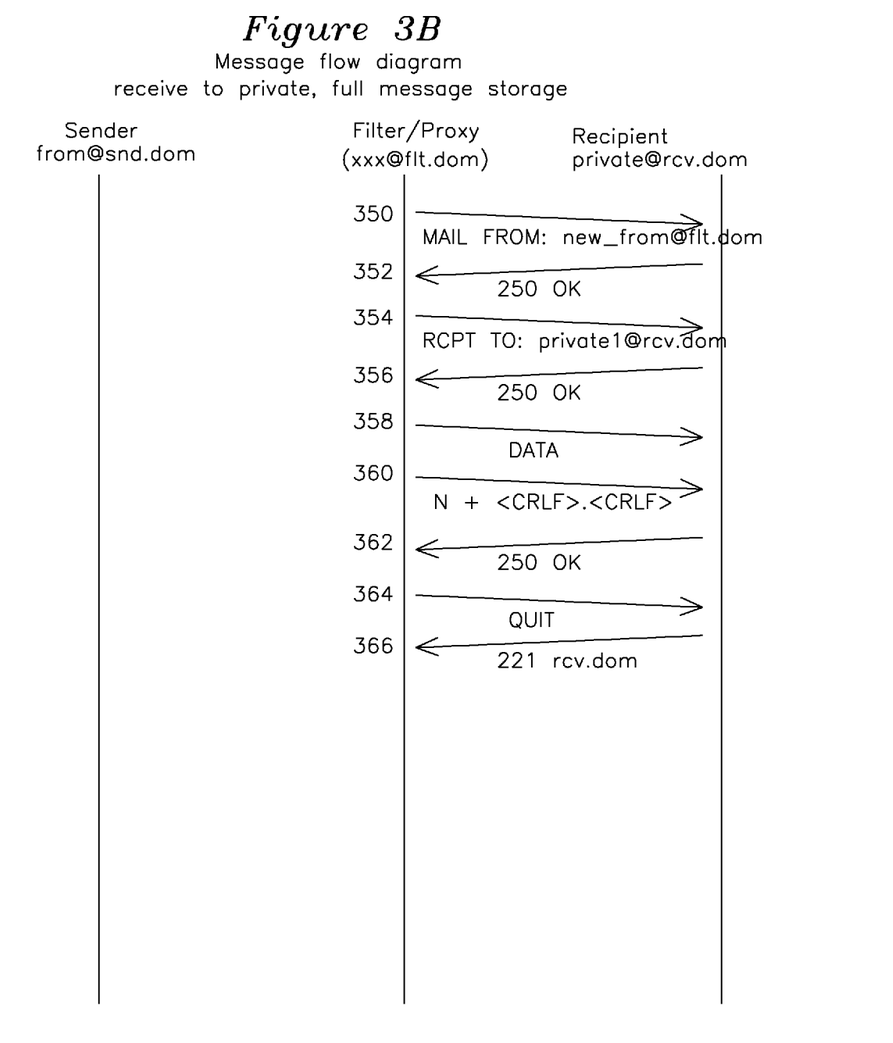

FIGS. 3A and 3B show a related message flow diagram for a "message store and filter/forward" embodiment, where the entire message is received from a sender 202 by the proxy 204, including SMTP HELO 310 and acknowledgement 312, SMTP MAIL FROM identifying the sender 314 and acknowledgement 316, SMTP RCPT TO recipient 318 and acknowledgement 320, SMTP DATA 322 followed by message data 324, proxy acknowledgement 326 and SMTP QUIT 328 and acknowledgement 330. After the message is received, the proxy filter algorithm 332 operates, thereby either dropping the message, or resolving the MAIL FROM and RCPT TO addresses to translated addresses, shown as "public1@flt.dom" translated to "private1@rcv.dom" as the new recipient, and "from@snd.dom" translated to "new_from@flt.dom". When the new message headers are identified from the public1@flt.dom record, the SMTP transfer to the recipient is performed with SMTP HELO packet 334 and acknowledgement 336, SMTP MAIL FROM 350 using the translated sender address such as "new_from@flt.dom" and acknowledgement 352, SMTP RCPT TO 354 using the translated recipient address such as "private1@rcv.dom" and acknowledgement 356, followed by SMTP DATA 358, message data 360, acknowledgement 362, and SMTP QUIT 364 and acknowledgement 366. One advantage of receiving the entire message prior to the proxy filter/translator step 332 as shown in FIGS. 3A and 3B is that any headers internal to the message may be extracted and used prior to forwarding the message.

Figure 4A:
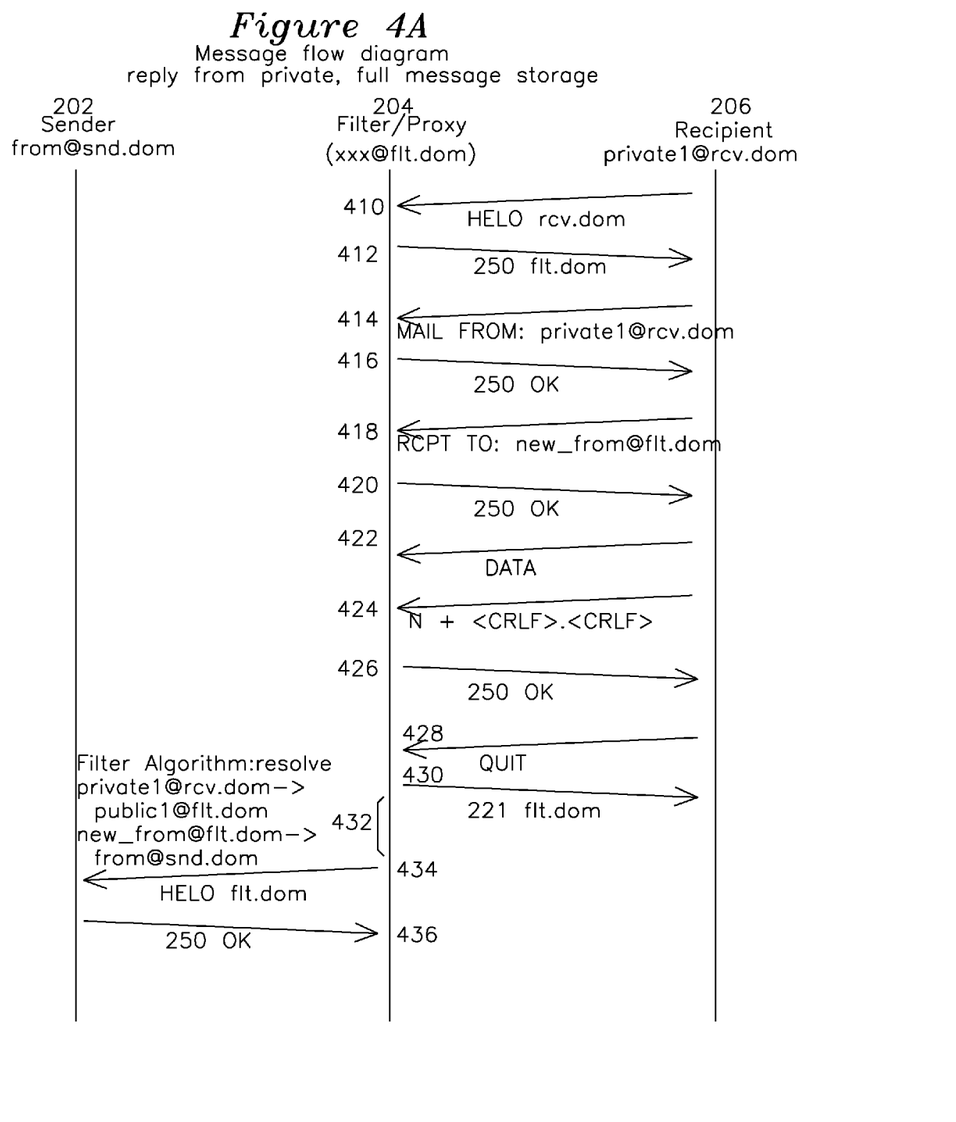
FIGS. 4A and 4B show a message flow diagram for a message or reply sent from a recipient to a sender via a proxy server.
Figure 4B:
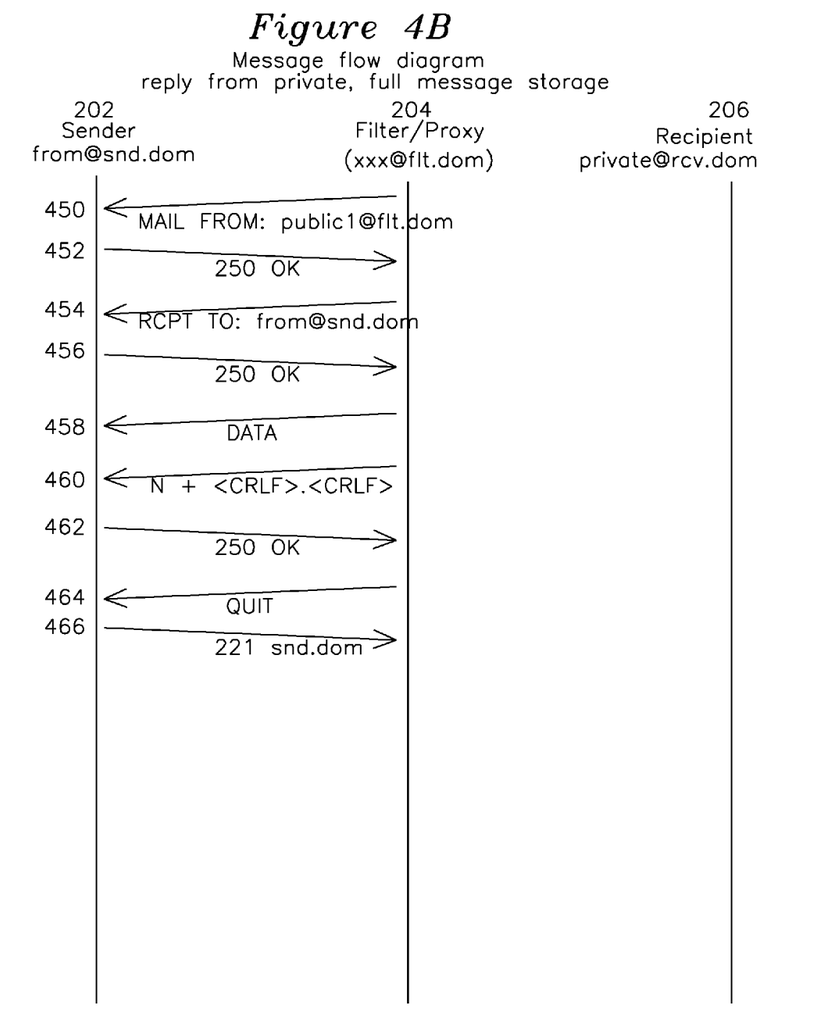

FIGS. 4A and 4B shows the sequence related to a recipient 206 replying to an email which has previously been received from a sender 202. The entire email message and server acknowledgements, comprising SMTP HELO 410, acknowledgement 412, SMTP MAIL FROM 414, acknowledgement 416, SMTP RCPT TO 418, acknowledgement 420, SMTP DATA 422, message data 424, acknowledgement 426, SMTP QUIT 428 and acknowledgement 430 are sent and received. The translation algorithm is entered in step 432 with the translated recipient address, such as new_from@flt.dom, which is used to form a second key, which is used to recover the original recipient example address from@snd.dom and original sender address "public1@flt.dom". These translated addresses are then used to send an email message back to the original sender, as shown in HELO 434, acknowledgement 436, SMTP MAIL FROM 450 with translated public address "public1@flt.dom", acknowledgement 452, SMTP RCPT TO with translated sender 454, acknowledgement 456, SMTP DATA 458 with message data 460, acknowledgement 462, SMTP QUIT 464, and acknowledgement 466. In this manner, a reply message is received by the proxy server 204 accompanied by a recipient address new_from@flt.dom and sender address private1@rcv.dom, which are translated back to the original sender address from@snd.dom and original recipient address public1@flt.dom, and the reply message bearing these translated address is delivered to the original sender.

Figure 5:
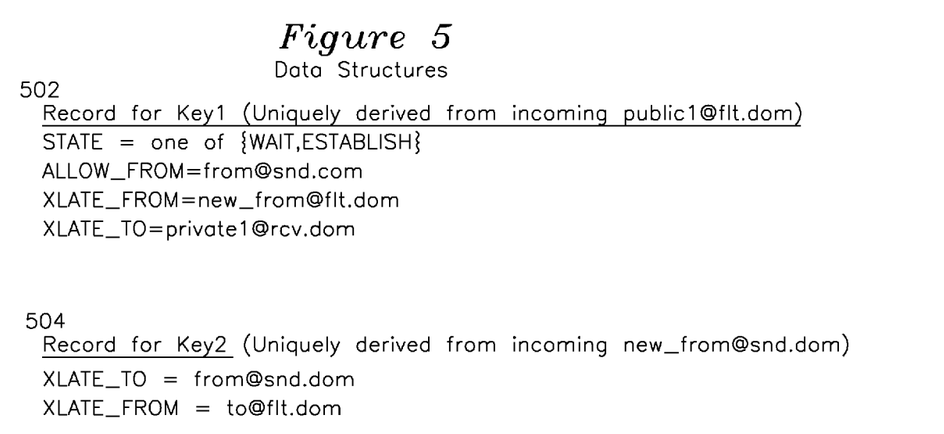
FIG. 5 shows the data structures of one embodiment of the invention.

FIG. 5 shows the data structures for one embodiment of the present invention. A first data structure 502 is generated upon registration of a user private email address, and is addressable using a first key, which may be generated from the public email address associated with the record, as will be described later. Each public email address must be unique so that the resolution of public email address to a record having a XLATE_TO field may be unambiguously performed. Each record associated with the first key has a STATE field which is settable, and ALLOW_FROM field indicating which sender is allowed for this public email address, XLATE_FROM and XLATE_TO fields which are used to translate new message sender and recipient, respectively. Usable STATE values are WAIT, indicating that a private recipient has registered an address that has not yet been used, and ESTABLISH, which means a message has been received, and all fields in the record are complete. A second key Key2 value is derived from the XLATE_FROM field, and the values of the record associated with the second key are XLATE_TO and XLATE_FROM, which are used for reply messages, where the recipient is replying to a message from "new_from@flt.dom" which originally was sent by "from@snd.dom".

Figure 6A:
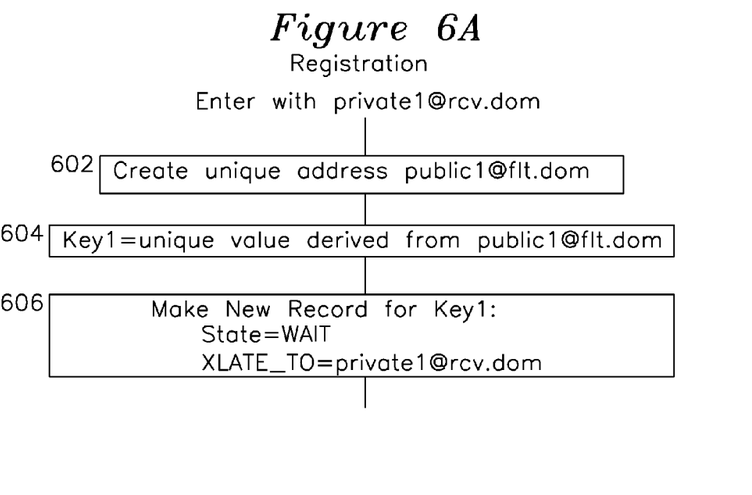
FIG. 6A shows a flowchart for registration.

FIG. 6A shows an overview of the registration process. A user having a private email address such as "private1@rcv.dom" requests a public email address, which is uniquely generated 602 and assigned in the example as "public1@flt.dom". The domain flt.dom resolves to the IP address of the mail proxy system, and the created account "public1" is unique for each public address, so that incoming emails resolve to unique usernames on the present host. As the usernames are unique, they may be hashed or otherwise used to form a unique value that can be used as a record key in step 604. The new record for the this key is created in step 606, and includes setting STATE to WAIT, and XLATE_TO to the registrant's email address, shown in this case as private1@rcv.dom.

Figure 6B:
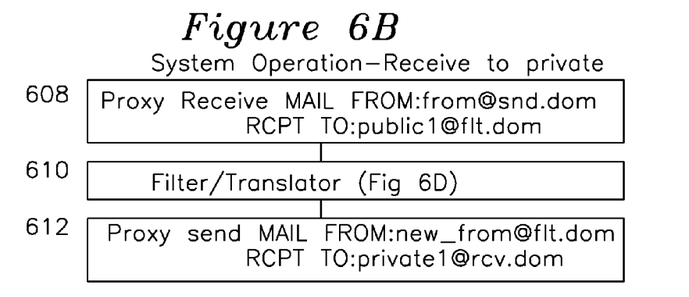
FIG. 6B shows a flowchart for a sender sending a message to a recipient.

FIG. 6B shows the operation of the process when an email message to a public address is received. Step 608 shows the values received from the SMTP MAIL FROM and RCPT TO steps described earlier, and these values are furnished to the filter/translator step 610, which either rejects the email, or sends the email in step 612 using the translated values.

Figure 6C:
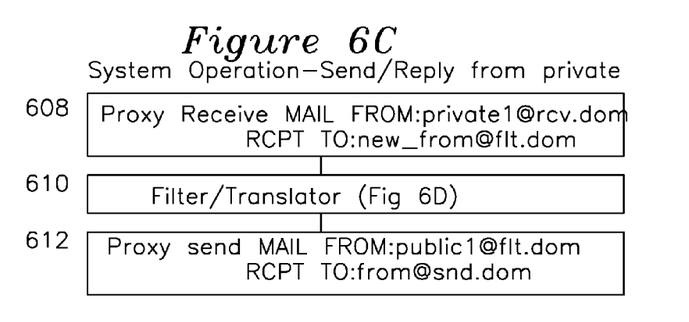
FIG. 6C shows a flowchart for a recipient sending or replying to a sender.

FIG. 6C shows the operation of the process when a reply message is received, such as when a user having received a message with translated MAIL FROM and RCPT TO headers uses these fields to reply. In this event, the email is received 608 and the translator 610 converts the SMTP message headers back to the original ones, such as from@snd.dom and public1@flt.dom, thereby preserving the sender's privacy.

Figure 6D:
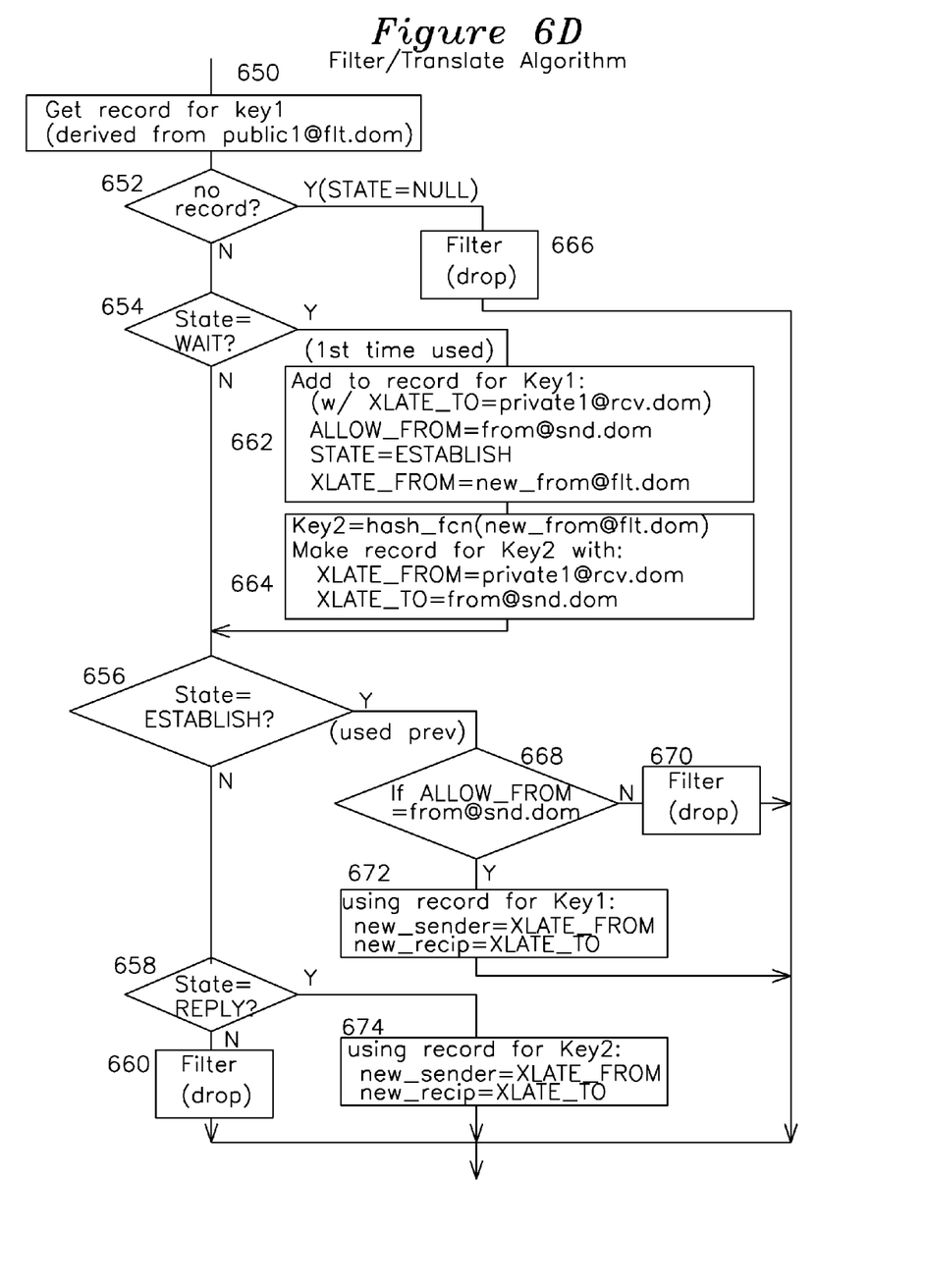
FIG. 6D shows a flowchart for a filter and translation algorithm.

FIG. 6D shows an example embodiment for the operation of the filter and translator. The filter and translator is entered with a public email address, such as "public1@flt.dom" and a sender email address, such as "from@snd.com", and a key is generated from the public email address value.

If no record exists for the key 652, the message is filtered 666, which indicates that the sender attempted to send to a non-existent public email address.

If a record for the associated public email address exists and the STATE value is WAIT 654, this indicates that the user has registered this public email address, but it has not been used yet, so the record contains only STATE=WAIT and XLATE_TO=private1@rcv.dom, which were initialized at the time of registration of the public email address, as described in FIG. 6A. In step 662, the XLATE_FROM value is updated with a unique value, shown as "new_from@snd.dom", and an optional field ALLOW_FROM is initialized with the sender's email address, shown as "from@snd.dom". The STATE value is updated to ESTABLISH, which indicates that the public address is ready to process the first and any subsequent emails directed to it. In order to process reply messages which will be directed to the translated recipient "new_from@flt.dom", a second key is generated in step 664 from the unique value "new_from", which is used to make a second record containing the translation fields for replies, which contain values for the fields XLATE_FROM and XLATE_TO. In this manner, a first record which is indexed by a first key derived from the public email address contains all the address translations required for sending messages from a sender to a private email address, and a second record which is indexed by a second key derived from the XLATE_FROM field of the first record allows for replies from the private email to be translated back to addresses which correspond to the original sender.

If the record for the key associated with the public email address as STATE=ESTABLISH 656, the associated ALLOW_FROM field is compared 668 with the sender address, and if there is no match, the message is filtered 670, otherwise the translation fields XLATE_FROM and XLATE_TO associated with the received public address (first key) are extracted from the associated record, and these fields are used for the new_sender and new_recipient address translations, respectively.

If the message is a reply message originating from a private address known to the system, the second key is formed from the unique sender address as known to the private recipient, which in the present example would be new_from@flt.dom. The second key record associated with new_from@flt.dom, such as 504 of FIG. 5, provides the translated sender and recipient addresses in step 674, which contain values initialized in previously executed step 664. The storage of values with associated first and second key may be done using either a database with database records, or they may be stored in a lookup memory such as any random access memory (RAM), a disk file, or in any manner known for maintaining records.

In another embodiment of the invention, a new state INCOMPLETE may be used to indicate the registration process of FIG. 6A step 602 is waiting for the user to acknowledge the address registration, after which the state is set to WAIT as in step 606.

In another embodiment of the invention, a new state ESTABLISH_ADD could be used to indicate that additional qualified ALLOW_FROM and XLATE_FROM senders should be added to the record 502.

Another embodiment of the invention allows the generation of a public address from a private address and translation of the public address back to the private address including message replies in a memoryless manner. Additionally, the new_from@flt.dom may be similarly translated to the from@snd.dom without the use of a database or message memory state storage as shown in FIGS. 7, 8, and 9.

Figure 7:
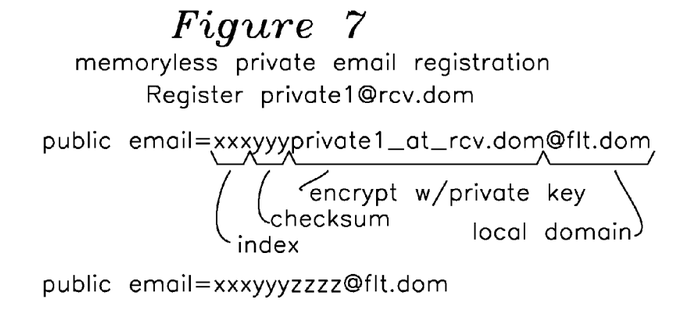
FIG. 7 shows an example memoryless private email registration step.

One example embodiment of a memoryless registration is shown in FIG. 7. A public address may be generated in from private1@rcv.dom using any function which provides for the complete or partial encryption of the parts private1@rcv.dom (the address to be concealed), xxx (an optional index, one per public address registration), and yyy, a checksum which provides a simple mechanism for determining whether the complete address are properly formed and valid. Using a private key known only to the proxy server in combination with a symmetric encryption such that $f_1(a,b)=c$ and $f_2(c,b)=a$, where a is a concatenation of fields including delimiters such as <index><checksum><private1@rcv.dom> and b is the private key known only to the email proxy server performing email address translations. In this manner, the registration of private email address private1@rcv.dom results in the generation of corresponding public email xxxyyyzzzz@flt.dom without the use of a database or any storage from one transaction to the next, as all the information required for translation is carried in the MAIL FROM: and RCPT TO: headers.

Figure 8:
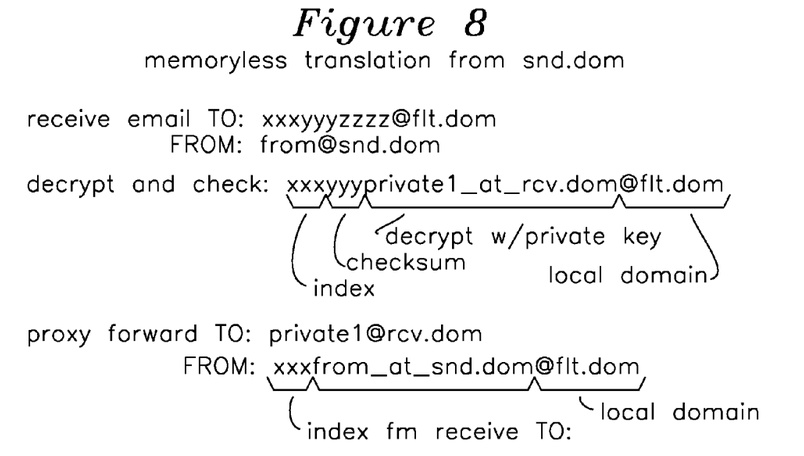
FIG. 8 shows an example memoryless translation step.

FIG. 8 shows one example of a memoryless translation of a first email received by the email proxy RCPT TO: xxxyyyzzzz@flt.dom MAIL FROM: from@snd.dom. The steps of FIG. 7 are performed in reverse, where a decryption results in the generation of xxxyyyprivate1_at_rcv.dom, which results in a translated RCPT TO: field of private1@rcv.dom, and the index xxx from the received RCPT TO: field is used to generate the MAIL FROM: field xxxfrom_at_snd.dom@flt.dom as shown.

Figure 9:
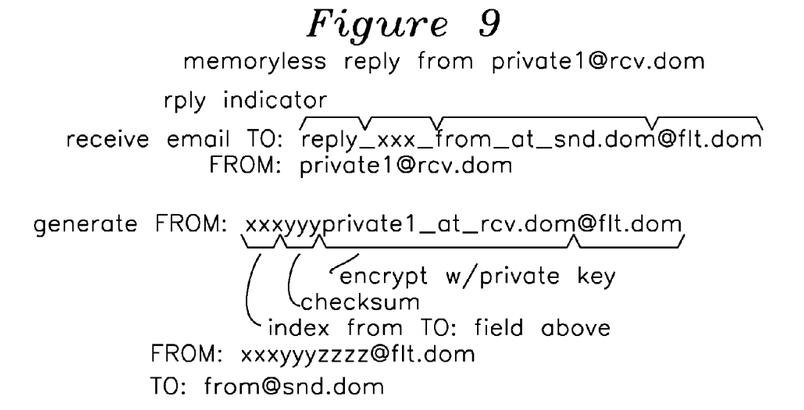
FIG. 9 shows an example memoryless reply step.

FIG. 9 shows a memoryless reply, where the parts of the RCPT TO: header are a "reply_" delimiter which denotes a message reply for handling, and is stripped off, "xxx" and "from_at_snd.dom", the index and reply address, respectively, from the previous MAIL FROM: field. These values are used to form the RCPT TO: address "from@snd.dom", and the MAIL FROM: address is generated using the index xxx and the concatenation and encryption algorithm described for FIG. 7.

The concatenation of FIG. 7 may be any prior art technique which provides separable field values, including simple delimiter strings such as < > to the more advanced techniques of MIME delimiters. The encryption and decryption methods may be any symmetric method known using a single private key, such as the "encrypt" and "decrypt" functions of the perl programming language, or any similar functions of the prior art.

We claim:

1. A process for forwarding an email message from a sender having an original sender email address to a recipient having a private email address, the process having:
   a first step whereby a recipient registers said private email address which results in an automatic generation of a unique public email address, derived from symmetric encryption of said private email address;
   a second step whereby upon receipt of an email message having a MAIL TO address and from a sender having a MAIL FROM email address, a private email address is extracted from said MAIL TO address and said email message is sent to said recipient private email address using a NEW FROM address derived from said MAIL FROM address as the sender address;
   a third step whereby when an email message is received having a MAIL FROM email address, a private email address is extracted from said public email address, said private email address examined to determine whether said private email address is valid and: rejecting said email message if said private email address is not valid; sending said email message to said extracted private email address if said public email address is valid, where said third step sending said email message uses said extracted private email address as a recipient address and generating a NEW FROM address derived from said sender address.

2. The process of claim 1 where said third step rejecting said email message includes receiving an entire said email message from said sender, thereafter not sending it to said private email address extracted from said public email address.

3. The process of claim 1 where said third step of sending said email includes receiving an entire message from said sender before sending said message to said private email address extracted from said public email address.

4. The process of claim 1 where said third step of sending said email message includes sending said message in parts to said extracted private email address during the interval said message is being received from said sender.

5. The process of claim 1 where said third step receiving said email includes receiving a header part including a sender identification and a recipient identification, after which a determination is made to either reject or send said message to said private email address extracted from said public email address.

6. The process of claim 1 where said sender is associated with a first domain, said public address is associated with a second domain, and said private address is associated with a third domain, and at least two of said first, second, and third domain are unique.

7. The process of claim 1 where said private address is associated with more than one public address.

8. The process of claim 1 where said first step uses an HTTP or HTTPS protocol, and said second and said third steps use an SMTP protocol.

9. The process of claim 1 where said symmetric encryption uses functions f1 and f2 in combination with operands A and B, where B is a private key and A is the concatenation of fields including at least an index, a checksum, and said private email address, and where said functions f1 and f2 have the property f1(A,B)=C and f2(C,B)=A.

10. The process of claim 1 where said symmetric encryption of said private address and said public address is performed using a local key and optionally including an index.

11. A process for filtering email, the process having:
a registration step whereby a private email address derived from said private email address and a checksum computed from said private email address is symmetrically encrypted into, and where said public email address can be symmetrically encrypted into said private email address and said checksum for validity checking said translated private email address,
a receiving email to a public address from a particular sender step where a private email address and a checksum is extracted from said public email address;
where:
if said extracted private email address checksum matches a checksum computed from said private email address, receiving said email message from said sender and then sending said email to said extracted private email address;
if said extracted private email address checksum does not match a checksum computed from said private email address, filtering said message.

12. The process of claim 11 where said registration step uses HTTP or HTTPS protocol and at least one of said receiving said email, or sending said email uses an SMTP protocol.

13. The process of claim 11 where said symmetric encryption uses functions f1 and f2 in combination with operands A and B, where B is a private key and A is the concatenation of said private email address, an index, and a checksum derived from the concatenated parts, and where said functions f1 and f2 have the property f1(A,B)=C and f2(C,B)=A.

14. The process of claim 11 where said registration step uses a local key to perform said symmetric translation.

15. The process of claim 11 where said receiving email to said public address and extracting said private email address from said public address includes forming a NEW FROM recipient field which is at least partially derived from said sender email address.

16. The process of claim 11 where said sending said email to said extracted email address includes generating a NEW FROM email address field from the sender information for use as a MAIL FROM: value of said sent message.

17. A process for sending and receiving emails between a sender and recipient including translating header information including a MAIL FROM: field and a RCPT TO: field, the process including:
a step of receiving a message including said headers;
a step of determining whether the RCPT TO: field is a public email address or the MAIL FROM: field is a private email address, said step performing a memoryless translation of said RCPT TO: field to a translation value which includes an index part, a checksum part, an encrypted private address part, the encrypted private address decrypted into a decrypted private address which is checked for validity using said checksum part, and when said validity check is true, determining that said RCPT TO: field is a public email address;
if said RCPT TO: field is a public email address, forwarding said message by forming a new RCPT TO: header using said decrypted private address and also generating a new MAIL FROM: header derived from said original MAIL FROM: field;
if said MAIL FROM: field is a private email address, forwarding said message by using said RCPT TO: field to derive a public email address and also generating a new MAIL FROM: header using said original MAIL FROM: field.

18. The process of claim 17 where determining whether said MAIL FROM: field is a private email address is done by extracting a decrypted private email address from said MAIL FROM: field and also extracting an index which is used to generate said new MAIL_FROM field.

19. The process of claim 17 where said RCPT TO: field is a public email address if a checksum extracted from said RCPT TO: field matches a checksum of an email address also extracted from said RCPT TO: field.

20. The process of claim 17 where said RCPT TO: field index part is used to form said MAIL_FROM: header when said RCPT TO: index field is a public email address.

* * * * *